UNITED STATES PATENT OFFICE.

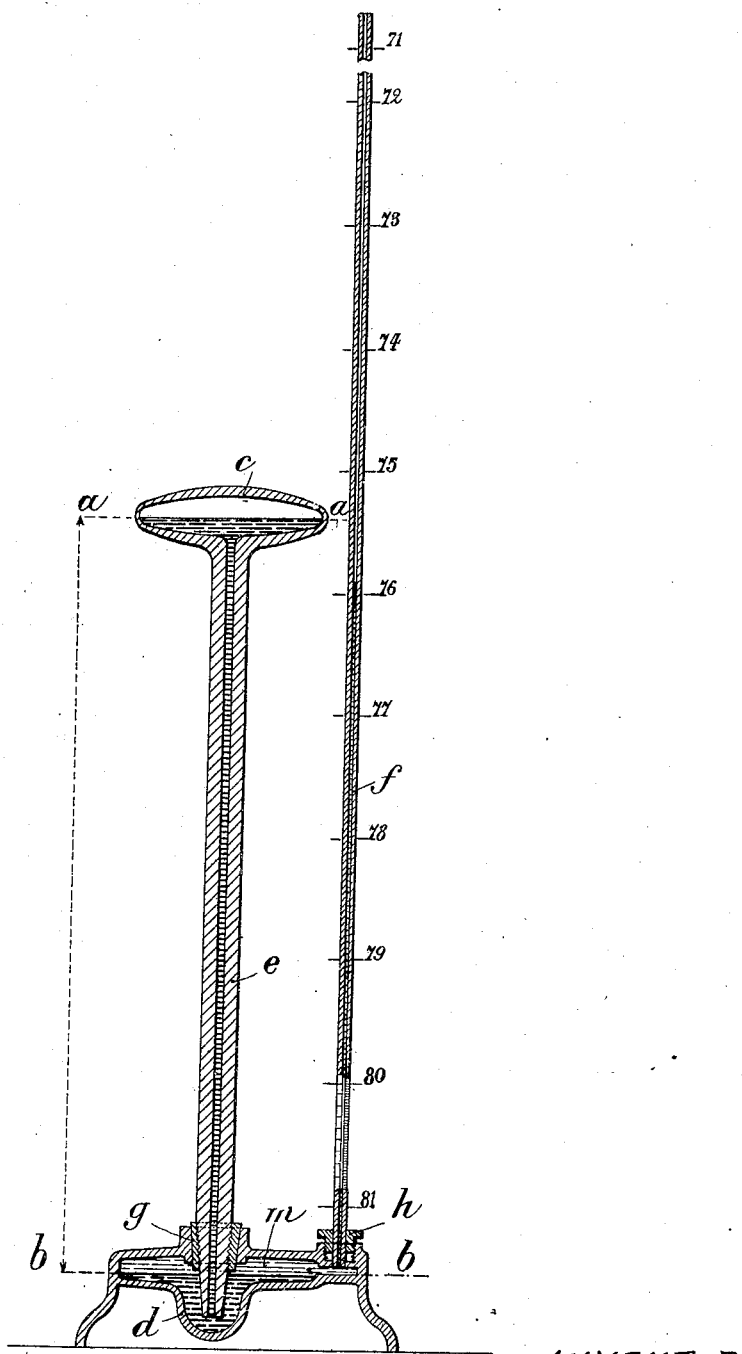

BUENAVENTURA JUNQUERA, OF OVIEDO, SPAIN.

BAROMETER.

No. 888,015.    Specification of Letters Patent.    Patented May 19, 1908.

Application filed January 17, 1908. Serial No. 411,250.

*To all whom it may concern:*

Be it known that I, BUENAVENTURA JUNQUERA, a subject of the King of Spain, residing at Campomanes 15, Oviedo, Spain, have invented new and useful Improvements in Barometers, of which the following is a specification.

The present invention has for its object the construction of a liquid barometer which possesses the advantage over the ordinary mercurial barometer of facilitating the reading of variations in the atmosphere pressure, by means of a special amplifying device. The ordinary column of mercury is for this purpose combined with a column of a liquid of a less density interposed between the atmosphere and the surface of the mercury in the cistern, in such a manner that the atmosphere pressure is actually represented by the weight of the mercury column less the weight of the column of liquid of less density.

It will be understood that if by widening the vacuum chamber of the mercury column and the cistern, the variations of the level of the mercury column due to the variations of atmospheric pressure are rendered almost inappreciable. The variations in height of the column of liquid of lesser density will virtually alone represent the variation of the atmospheric pressure.

One form of the invention is shown, by way of example, in sectional elevation, in the annexed drawing.

The barometer comprises a cistern $d$, into the cap of which there penetrates, through a fluid-tight joint $g$, a mercury tube $e$, of which the upper part $c$, forming a vacuum chamber, is suitably widened. Above the level $b$ $b$ of the mercury the cistern is filled with a liquid $m$ of relatively smaller density, such for example as water, or preferably a non-volatile liquid (oil, glycerin or the like). The tube $e$ enters the mercury as in an ordinary barometer, and into the liquid $m$, passing through the cap by means of a fluid-tight joint $h$, there is inserted a second tube $f$, which is open to the atmosphere at its upper end.

Supposing for example that a liquid is employed, whose density is 1/14th the density of mercury, and that it is desired to read variations in pressure of 5 centimeters above and below the mean pressure of 76 centimeters, the tube $f$ should have, on either side of a level which corresponds to the mean pressure, and which will be marked 76, a height of $5 \times 14 = 70$ centimeters, that is to say, the total graduated height should be 1 meter 40 centimeter. On this column each centimeter of mercury will be correspondingly represented by 14 centimeters of liquid of lesser density. The readings will consequently be made with immensely greater facility and accuracy, since it is easy to divide up a column 14 centimeters in length, while the fractions of a column of one centimeter length can only be distinguished with difficulty. It is clear that provided that the apparatus is in equilibrium at a mean atmospheric pressure of 76 centimeters, and that the level of the liquid in the tube $f$ is then at the 76 mark, it is necessary that the difference in level $a$—$b$ of the mercury in the chamber $c$ and in the cistern $d$ be $76 + 5 = 81$ centimeters. The tube $e$ will be constructed accordingly.

In a general way it is necessary for the column of mercury to have a total height greater by five centimeters than the mean pressure at the place where the barometer is used. Supposing that the atmospheric pressure exceeds the mean of 76 by one centimeter for example, the liquid in the tube $f$ will be lowered by 14 centimeters, and will fall to the 77 division. The liquid driven out of the tube $f$ will pass into the cistern $d$, and cause a displacement in the level $b$—$b$ and a flow of mercury into the chamber $c$, and if, for example, the tube $f$ has an internal diameter of 4 millimeters, thus having in round figures a section of about 12 square millimeters, and that the cistern has a diameter of 200 millimeters equivalent to 30,000 square millimeters in section approximately, an alteration in level of 14 centimeters (1 division) in the tube $f$ will cause a variation in the level in the cistern of $\frac{12 \times 140}{30,000} = 0.056$ millimeters. So that if the pressure changes from 71 to 81 centimeters of mercury the fall in level of the mercury in the cistern $d$ and rise in the chamber $c$ would be 10 times 0.056 millimeters, that is 0.56 millimeters. The maximum error is thus but little more than 1 millimeter of mercury, which represents 14 millimeters and this is divided over a graduated length of 1 m. 40 cm. This can be allowed for in the formation of the scale engraved on the tube $f$ itself or on a card attached to the apparatus.

The apparatus described above possesses over mercury barometers the advantages described above. Over water barometers it possesses the advantage of possessing a mercury vacuum chamber which secures a perfect vacuum. In short the apparatus combines the advantages of both the mercury and water barometers without any of the disadvantages of these two well known contrivances.

I claim.

A barometer comprising a closed cistern, containing a heavy liquid such as mercury, the space between the level of this liquid and the cap being filled with a light liquid; a tube closed at its upper end forming a vacuum chamber, and inserted at its lower end into the heavy liquid and a tube, open to the atmosphere, inserted into the liquid of lesser density; the atmospheric pressure being thus represented by the weight of the column of heavy liquid less the weight of the column of light liquid.

In testimony whereof I have signed my name to this specification in the presence of two subscribing witnesses.

BUENAVENTURA JUNQUERA.

Witnesses:
FRANCISCO MUNGUIA,
ALBERTO UNRUE.